United States Patent [19]

Bianchi

[11] Patent Number: 4,472,639
[45] Date of Patent: Sep. 18, 1984

[54] TAILGATE ATTACHMENT FOR EXTENDING THE CARGO SPACE OF VEHICLES

[76] Inventor: Barry E. Bianchi, 1751 First Ave., Walnut Creek, Calif. 94596

[21] Appl. No.: 455,322

[22] Filed: Jan. 3, 1983

[51] Int. Cl.³ .............................................. B62D 33/08
[52] U.S. Cl. ..................... 296/26; 296/57 R
[58] Field of Search ............... 296/27, 26, 37.6, 50, 296/51, 57 R, 24 R, 76, 169

[56] References Cited

U.S. PATENT DOCUMENTS

| | | | |
|---|---|---|---|
| 1,266,521 | 5/1918 | Norquist | 296/26 |
| 1,289,997 | 12/1918 | Wyeth | 296/26 |
| 1,919,063 | 7/1933 | Hubbard | 296/26 |
| 2,729,499 | 1/1956 | Eggum | 296/26 |
| 2,852,303 | 9/1958 | Hopson | 296/26 |
| 3,632,153 | 1/1972 | Knudsen | 296/169 |
| 4,023,850 | 5/1977 | Tillery | 296/26 |

*Primary Examiner*—Robert R. Song
*Attorney, Agent, or Firm*—Phillips, Moore, Lempio & Finley

[57] ABSTRACT

Retractable extender structure (11) for the tailgate (12) of a pick-up truck or other vehicle (13) enables quick and convenient enlargement of the cargo space (14) of the vehicle when necessary. A back panel (26) and side panels (27A,27B) are compactly carried against the inside surface (23) of the closed tailgate when not in use while being pivotable into perpendicular relationship to the opened tailgate to increase cargo space.

5 Claims, 6 Drawing Figures

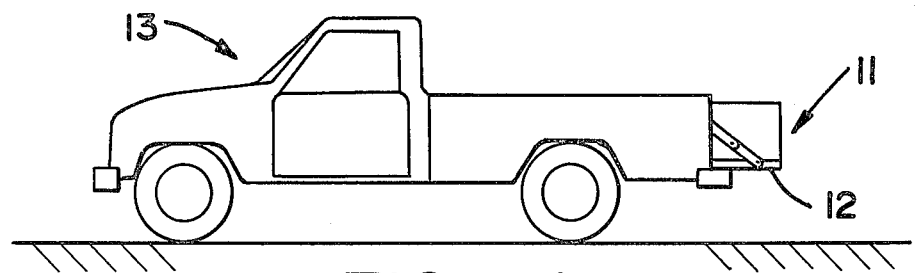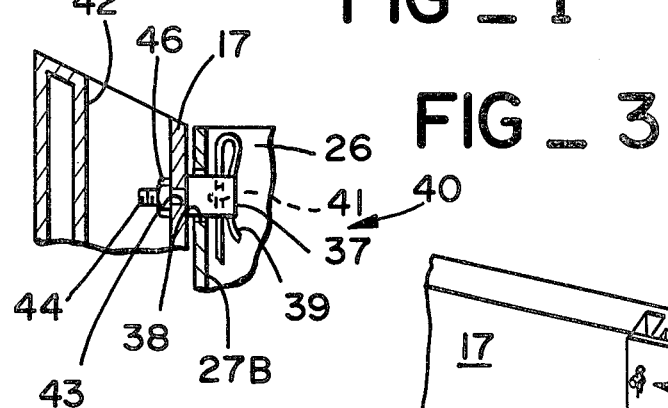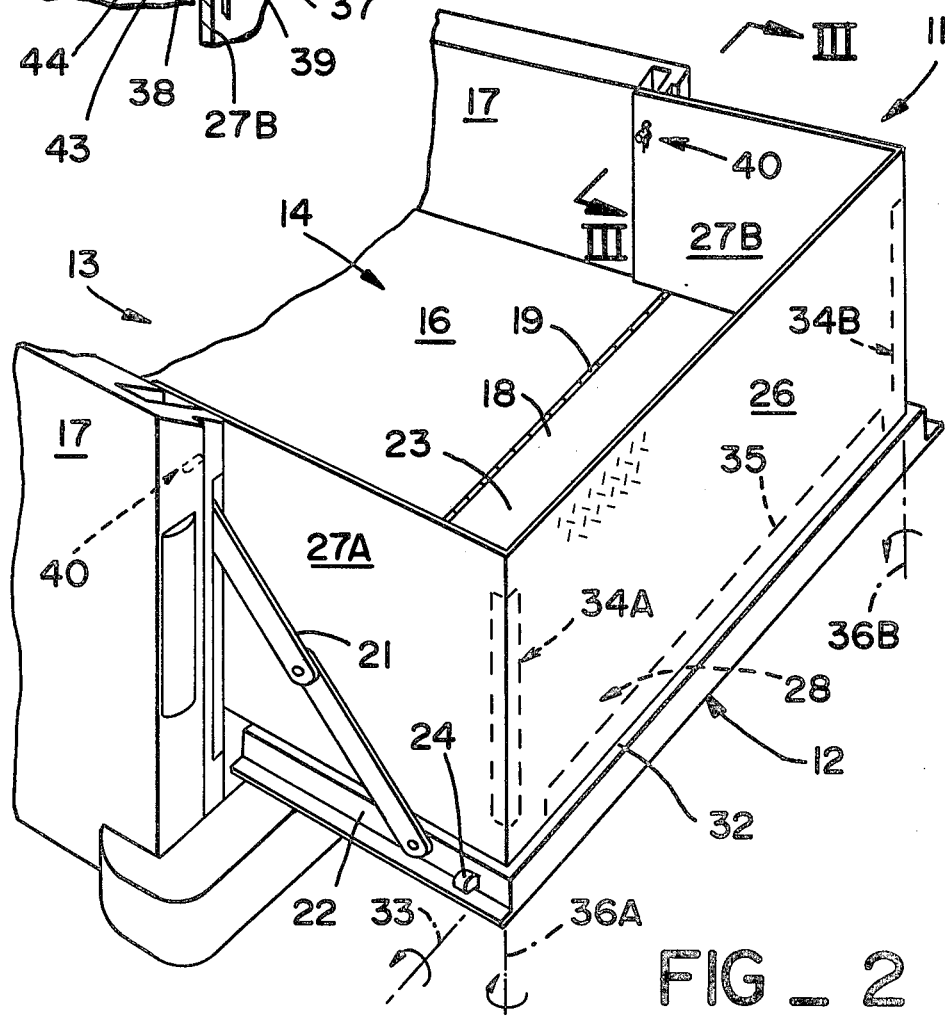

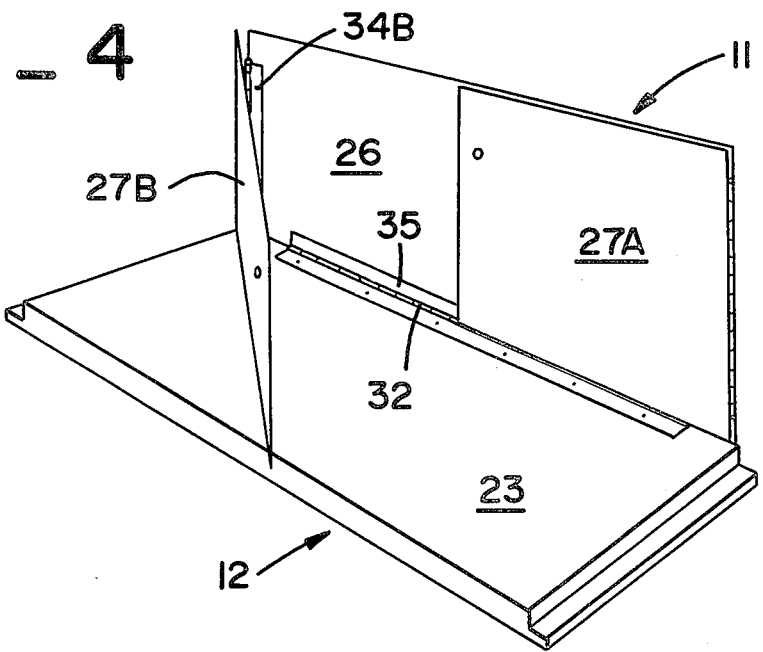
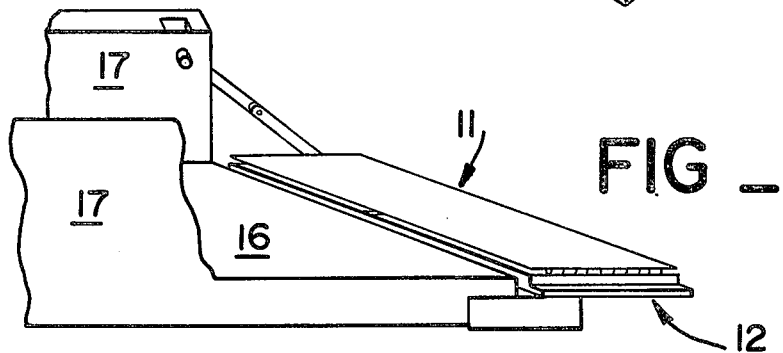
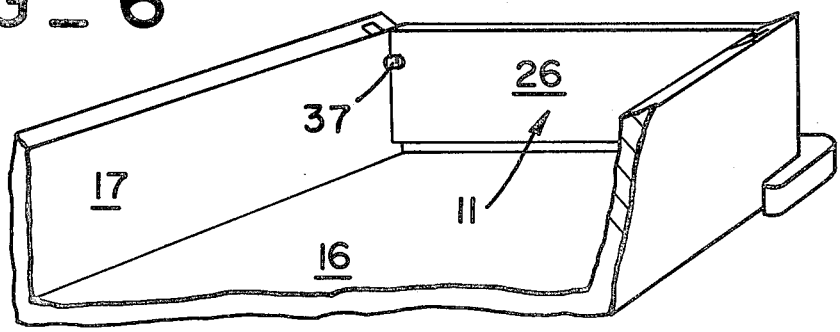

TAILGATE ATTACHMENT FOR EXTENDING THE CARGO SPACE OF VEHICLES

TECHNICAL FIELD

This invention relates to vehicles which have a bed, sidewalls and a tailgate that define a cargo space for carrying articles. More particularly, the invention relates to extender structures for optionally enlarging the cargo space in such vehicles.

BACKGROUND OF THE INVENTION

Operators of pickup trucks, station wagons or other vehicles having a tailgate may find it necessary to transport articles which do not fit within the available cargo space when the tailgate is in the upright closed position. This has become a more common occurrence with the recent increased usage of small economy sized vehicles although an occasional need for more cargo space is not confined to users of such vehicles. In such cases, purchasers may acquire a larger vehicle than is needed for most purposes in order to be able to carry an occasional over-sized load.

Problems and complications occur if the conventional tailgate of such vehicles is left open in order to accomodate lengthy or bulky loads. Time consuming efforts to lash or otherwise secure the load in place are usually needed to forestall possible loss of the load during travel. As a practical matter, such loads are sometimes inadequately secured. The resulting loss of articles during travel is not only undesirable in itself but can also be a safety hazard to the occupants of other vehicles. Such transporting of loads with a conventional tailgate in the open position may also require that the vehicle be driven more slowly than would otherwise be necessary.

Structures heretofore designed for the purpose of extending the cargo space of trucks or other vehicles are subject to complications and disadvantages that may have restricted widespread use. In some cases extensive modifications in the basic design of the vehicle itself are needed in order to accomodate such structures. In other instances the extender structure is bulky and must be removed and stored when not in use. In still other cases, the prior extender structures do not provide an adequate degree of enclosure of the extended cargo space at least for many purposes.

The present invention is directed to overcoming one or more of the problems set forth above.

SUMMARY OF THE INVENTION

A tailgate attachment is provided for a vehicle which has a cargo space defined by a bed, upright sidewalls and a pivoting substantially rectangular tailgate, the tailgate having an inside surface which faces the cargo space when the tailgate is at a closed upright position and which extends substantially horizontally to the rear of the bed when the tailgate is at an open position. The attachment includes a substantially rectangular back panel and a pair of side panels having configurations adapted to form a rearward extension of the cargo space, and hinge means for attaching the panels to the tailgate along the edges of the back panel and tailgate which are uppermost when the tailgate is at the closed position, while enabling pivoting of the panels between a retracted position at which the panels are parallel to the tailgate surface and an extended position at which the panels extend substantially perpendicularly from the tailgate surface when the tailgate is at the open position.

In one aspect of the present invention, the hinge means pivotally couples each side panel to a separate side of the back panel enabling the side panels to be pivoted into parallel relationship with the back panel and thereby enabling pivoting of the back panel including the side panels into parallel relationship with the inside surface of the tailgate.

In another aspect of the invention, the hinge means includes at least one first hinge connected between the portions of the back panel and the tailgate which are uppermost when the tailgate is at its closed upright position and further includes at least a pair of second hinges each being connected between a separate side of the tailgate and a separate one of the side panels, the pivot axes of the second hinges being at right angles to the pivot axis of the first hinge.

In still another aspect of the invention, the side panels are proportioned to overlap the vehicle sidewalls when in the extended position and the apparatus further includes fastener means for selectively fastening the side panels to the vehicle sidewalls at the overlapping portions thereof.

In still another aspect of the invention, a vehicle having a bed with sidewalls for transporting articles and having a tailgate which may be pivoted from a vertical closed position to a horizontal opened position at which the tailgate forms an extension of the bed further includes a back panel pivotally coupled to the portion of the tailgate which is remote from the bed when the tailgate is at the opened position and being pivotable between parallel and perpendicular relationships to the tailgate, a pair of side panels each pivotally coupled to the back panel at a separate side of the tailgate and each being pivotable between a parallel relationship to the back panel and a right angled relationship to the back panel, and means for releasably securing the side panels in right angled relationship to the back panel.

The invention enables quick and convenient enlargement of the walled cargo space in a vehicle which has a tailgate. The extender structure compactly folds against the inside surface of the tailgate when not in use and does not significantly obstruct use of the basic vehicle cargo space in the conventional manner. The extender structure may be economically manufactured and installed either as a built-in component of new vehicles or as an attachment for pre-existing vehicles.

The invention, together with additional aspects and advantages thereof, may be further understood by reference to the accompanying drawings and to the following description of a preferred embodiment.

BRIEF DESCRIPTION OF THE DRAWINGS

In the accompanying drawings:

FIG. 1 is a side elevation view of a vehicle equipped with a cargo space extender in accordance with an embodiment of the present invention;

FIG. 2 is a perspective view of a portion of the vehicle of FIG. 1 including the cargo space extender structure;

FIG. 3 is a section view taken along line III—III of FIG. 2, and

FIGS. 4, 5 and 6 are perspective views of the tailgate and extender structure of the vehicle of FIGS. 1 to 3 illustrating successive stages in the retraction of the extender structure from the active configuration to the inactive position.

DETAILED DESCRIPTION OF A PREFERRED EMBODIMENT

Referring initially to FIG. 1 of the drawings, a tailgate attachment or cargo space extender 11 in accordance with this embodiment of the invention is depicted in the active, extended position at the tailgate 12 of a vehicle 13 which is a pick-up truck in this example. It should be recognized that similar extender structure 11 may be used with other types of vehicle, such as station wagons for example, that have a tailgate 12 which can be pivoted from an upright closed position to an opened essentially horizontal position.

Referring now to FIG. 2, the truck vehicle 13 of this example is of conventional construction except for the cargo space extender structure 11 and thus has a cargo space 14 defined in part by a bed 16 and an upright sidewall 17 at each side of the bed. The essentially rectangular tailgate 12 has an edge 18 adjacent the back of bed 16 which is coupled to the bed by conventional hinges 19 to enable pivoting of the tailgate between the open and closed positions. Articulated linkage 21, connected between the sides 22 of the tailgate 12 and the cargo space sidewalls 17, limits opening of the tailgate to a position at which the inner surface 23 of the tailgate is horizontal and in effect forms a rearward extension of bed 16. Releasable latch means 24, which may be of any of various known constructions, hold the tailgate 12 in place when it is at the closed upright position.

The extender structure 11 of this embodiment includes a rectangular back panel 26 and rectangular side panels 27A and 27B and hinge means 28 for enabling pivoting of the panels between a retracted position at which the panels are parallel to inside surface 18 of the tailgate 12 and an extended position at which the panels extend perpendicularly from the tailgate surface when the tailgate is at the open position.

Back panel 26 of this embodiment is a flat rectangular element which preferably has dimensions similar to those of the inside surface 23 of the tailgate 12 although a smaller back panel may if used if it is not necessary to maximize the extended cargo space. While other materials may be employed, it is advantageous to form the back panel of dimpled or embossed sheet steel to maximize strength and rigidity while minimizing thickness.

Back panel 26 has an edge 29 situated parallel and proximal to the edge 31 of the tailgate 12 which is remote from the truck bed 16 when the tailgate is at the opened position. The hinge means 28 includes a first hinge 32 connected between panel edge 29 and tailgate edge 31 with the pivot axis 33 of the hinge being parallel to edges 29 and 31 to provide for pivoting of the back panel between parallel and perpendicular relationships to the tailgate surface 18. While a single long first hinge 32 is used in this example of the invention it is also possible to employ two or more relatively short hinges or other types of pivot coupling. To facilitate folding of the extender 11 into the retracted position as will hereinafter be described in more detail, first hinge 32 is of the type having leaves 35 which remain slightly spaced apart when turned into parallel relationship.

Side panels 27A and 27B of this specific embodiment are flat rectangular sheet steel members sufficiently thin to extend between leaves 35 of the back panel hinge 32 when the extender 11 is in the retracted position although other configurations and materials can be utilized. Each such side panel 27A and 27B is hinged to a separate side of back panel 26 by one of a pair of second hinges 34A and 34B. The pivot axes 36A and 36B of second hinges 34A and 34B respectively are orthogonal to the axis 33 of first hinge 32 enabling pivoting of the side panels 27A, 27B between a parallel relationship to back panel 26 and a right angled relationship to the back panel.

The side panels 27A and 27B of this embodiment are sufficiently long to overlap the extreme back portions of the truck sidewalls 17 when the side panels are at the right angled relationship to the back panel 26 as depicted in FIG. 2 and means 40 are provided for releasably securing the panels in that relationship when the extender 11 is in use. Referring to FIG. 3, such means 40 in this embodiment includes a pin 37 which protrudes a short distance from the truck sidewall 17 and which is positioned to extend through an opening 38 in the portion of the adjacent side panel 27B which overlaps the sidewall. Side panel 27B is held on pin 37 by a spring clip 39 or the like which is inserted into a transverse bore 41 through the pin and which can be easily removed when the side panel is to be folded back against back panel 26.

Referring to FIGS. 1 and 3 in conjunction, the pick-up truck 13 in this particular example is of the type having built-in vertical passages 42 at the back of sidewalls 17 for receiving stakes. The pin 37 may be easily installed on this type of truck 13 by drilling a small opening 43 into the stake passage 42 to receive a threaded, reduced diameter portion 44 of the pin which is then secured with a nut 46 situated in the passage. In vehicles which lack such stake passages 42, the pin 37 may be secured with an expansion bolt or other known fasteners that do not require access to the interior of the sidewall.

Referring now to FIG. 4, this particular embodiment of the invention was designed to be easily installable on a preexisting vehicle which originally lacked extender structure 11. Many owners of such vehicles may have only simple tools available. To facilitate installation by such persons, the first hinge 32 through which the extender 11 is connected to the tailgate 12 is preferably of the type which can be attached with sheet metal screws or other easily engaged fasteners. Fastening of the hinge 32 to back panel 26 may, if desired, be accomplished differently during manufacture of the extender 11 such as by welding for example.

Operation

In operation, back panel 26, side panels 27A, 27B and the surface 23 of the tailgate 12 form a sizable extension of the walled cargo space 14 of the vehicle when the attachment 11 is in the extended configuration depicted in FIG. 2. Articles significantly longer or bulkier than could otherwise be accomodated may be transported with essentially the same degree of enclosure as is provided when the tailgate 12 is in the closed position.

Although the invention is not limited to use with any specific size of vehicle, it is of interest that many pick-up trucks 13 are currently manufactured in so called short bed and long bed models which have cargo beds 16 with lengths of about six feet (1.8 m) and eight feet (2.4 m) respectively. The tailgate 12 proportions of many such trucks are such that an extender attachment 11 of the herein described type enables optional enlargement of the cargo space 14 of the short bed models to approximately the same size as that of the long bed models.

When the extended cargo space is not needed, the attachment 11 is easily and quickly folded into a compact configuration at which it does not constitute any significant obstruction in the basic cargo space 14 of the vehicle 13. The side panel securing means 40 are released by withdrawing spring clips 39, shown in FIG. 3, from pins 37. Referring now to FIG. 4, side panels 27A and 27B are than pivoted towards back panel 26. When the side panels 27A, 27B are parallel and adjacent to the back panel 26, the back panel including the side panels is pivoted into parallel relationship with the tailgate 12 as depicted in FIG. 5. The tailgate 12 may then itself be pivoted to the closed upright position and latched and the vehicle 13 may be used to transport articles in the conventional manner. The extender structure 11 lays flat and compactly against the inside surface of the tailgate 12 without significantly reducing the cargo space 14.

It should also be noted, with reference again to FIG. 5, that the extender structure 11 in the retracted position does not interfere with carrying of very lengthy articles which extend beyond the opened tailgate 12 in instances where such articles cannot be fitted within the extended cargo space provided by the structure.

Referring again to FIG. 6, gravity acts to hold the extender structure 11 in the retracted position when tailgate 12 is closed but it is preferable to provide for a more positive hold down in order to prevent vibration and noise. While a latch might be provided for this purpose, the hold down is accomplished automatically in this embodiment by locating pins 37 at a longitudinal position on sidewalls 17 at which the back panel 26 abuts the pins when tailgate 12 is swung to the closed position.

While the invention has been described with reference to a specific embodiment or example, many variations are possible and it is not intended to limit the invention except as defined in the following claims.

I claim:

1. A tailgate attachment for a vehicle which has a cargo space defined by a bed, upright sidewalls and a substantially rectangular pivoting tailgate, the tailgate having an inside surface which faces the cargo space when the tailgate is at a closed upright position and which extends substantially horizontally to the rear of the bed when the tailgate is at an open position, comprising:

a substantially rectangular back panel and a pair of side panels having configurations adapted to form a rearward extension of said cargo space, and hinge means for attaching said panels to said tailgate while enabling pivoting of said panels between a retracted position at which said panels are parallel to said tailgate surface and an extended position at which said panels extend substantially perpendicularly from said tailgate surface when said tailgate is at said open position, wherein said hinge means couples said back panel to said tailgate along the edges thereof which are uppermost when said tailgate is at said closed position and wherein said hinge means pivotally couples each of said side panels to a separate side of said back panel enabling said side panels to be pivoted into parallel relationship with said back panel thereby enabling pivoting of said back panel including said side panels into parallel relationship with said inside surface of said tailgate.

2. A tailgate attachment for a vehicle which has a cargo space defined by a bed, upright sidewalls and a substantially rectangular pivoting tailgate, the tailgate having an inside surface which faces the cargo space when the tailgate is at a closed upright position and which extends substantially horizontally to the rear of the bed when the tailgate is at an open position, comprising:

a substantially rectangular back panel and a pair of side panels having configurations adapted to form a rearward extension of said cargo space, and hinge means for attaching said panels to said tailgate while enabling pivoting of said panels between a retracted position at which said panels are parallel to said tailgate surface and an extended position at which said panels extend substantially perpendicularly from said tailgate surface when said tailgate is at said open position, wherein said hinge means couples said back panel to said tailgate along the edges thereof which are uppermost when said tailgate is at said closed position and wherein said hinge means includes at least one first hinge connected between the portions of said back panel and said tailgate which are uppermost when said tailgate is at said closed upright position, and at least a pair of second hinges each being connected between a separate side of said tailgate and a separate one of said side panels, the pivot axes of said second hinges being at right angles to the pivot axis of said first hinge.

3. A tailgate attachment for a vehicle which has a cargo space defined by a bed, upright sidewalls and a substantially rectangular pivoting tailgate, the tailgate having an inside surface which faces the cargo space when the tailgate is at a closed upright position and which extends substantially horizontally to the rear of the bed when the tailgate is at an open position, comprising:

a substantially rectangular back panel and a pair of side panels having configurations adapted to form a rearward extension of said cargo space, and hinge means for attaching said panels to said tailgate while enabling pivoting of said panels between a retracted position at which said panels are parallel to said tailgate surface and an extended position at which said panels extend substantially perpendicularly from said tailgate surface when said tailgate is at said open position, wherein said hinge means couples said back panel to said tailgate along the edges thereof which are uppermost when said tailgate is at said closed position and wherein said side panels are proportioned to overlap said vehicle sidewalls when in said extended position, further including fastener means for selectively fastening said side panels to said vehicle sidewalls at the overlapping portions thereof.

4. In a vehicle having a bed with sidewalls for transporting articles and having a tailgate which may be pivoted from a vertical closed position to a horizontal opened position at which said tailgate forms an extension of said bed, the combination comprising:

a back panel pivotally coupled to the portion of said tailgate which is remote from said bed when said tailgate is at said opened position thereof and being pivotable between a parallel relationship to said tailgate and a perpendicular relationship thereto, a pair of side panels each being pivotally coupled to said back panel at a separate side of said tailgate and each being pivotable between a parallel relationship to said back panel and a right angled relationship thereto, and
means for releasably securing said side panels in said right angled relationship to said back panel.

5. The apparatus of claim 4 wherein said means for releasably securing said side panels in said right angled relationship to said back panel includes elements secured to said vehicle sidewalls that engage said side panels when said side panels are at said right angled relationship to said back panel, said elements being at locations on said vehicle sidewalls at which said elements are abutted by said back panel when said panels are in said parallel relationships and said tailgate is at said vertical closed position.

* * * * *